UNITED STATES PATENT OFFICE.

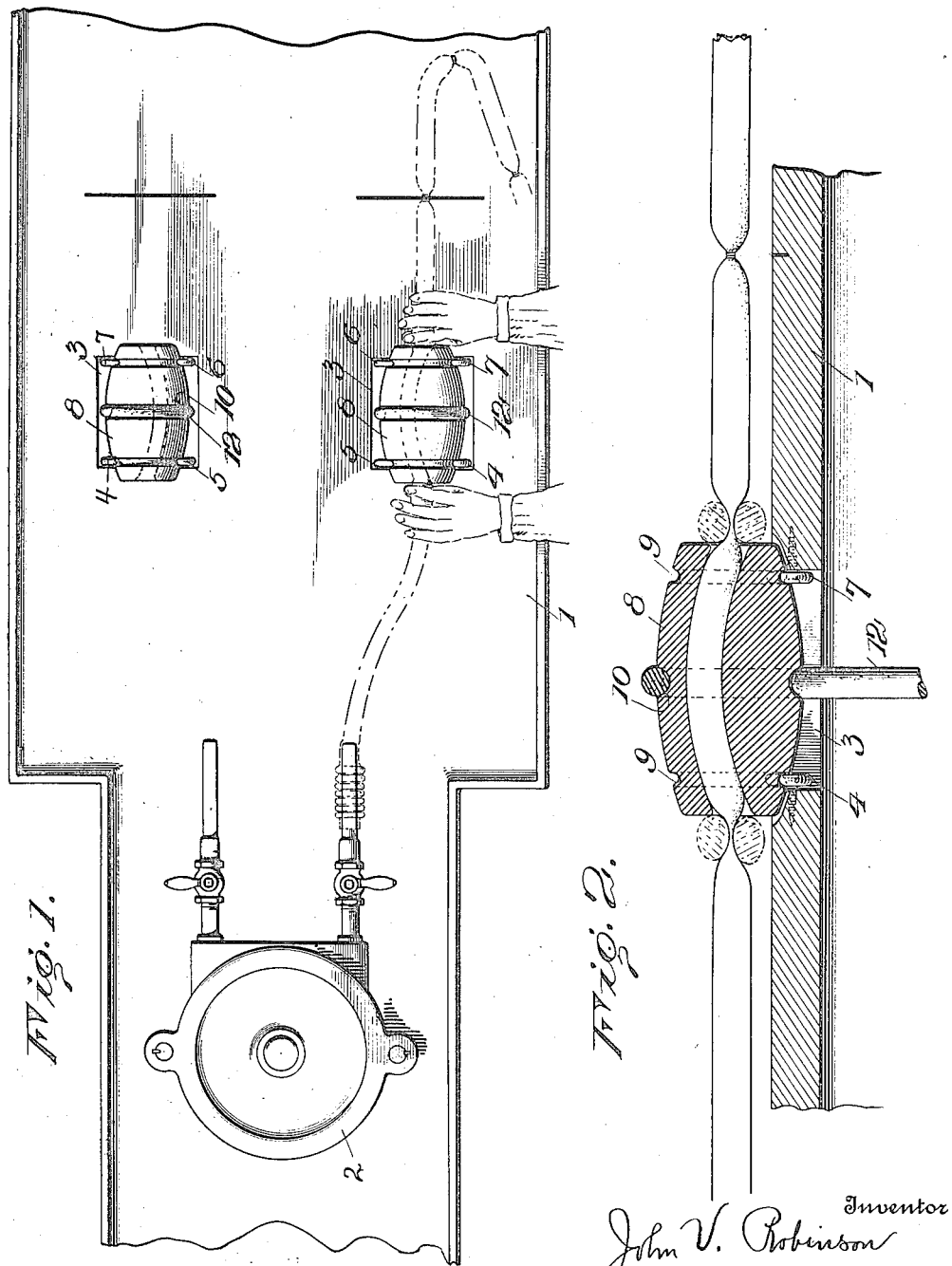

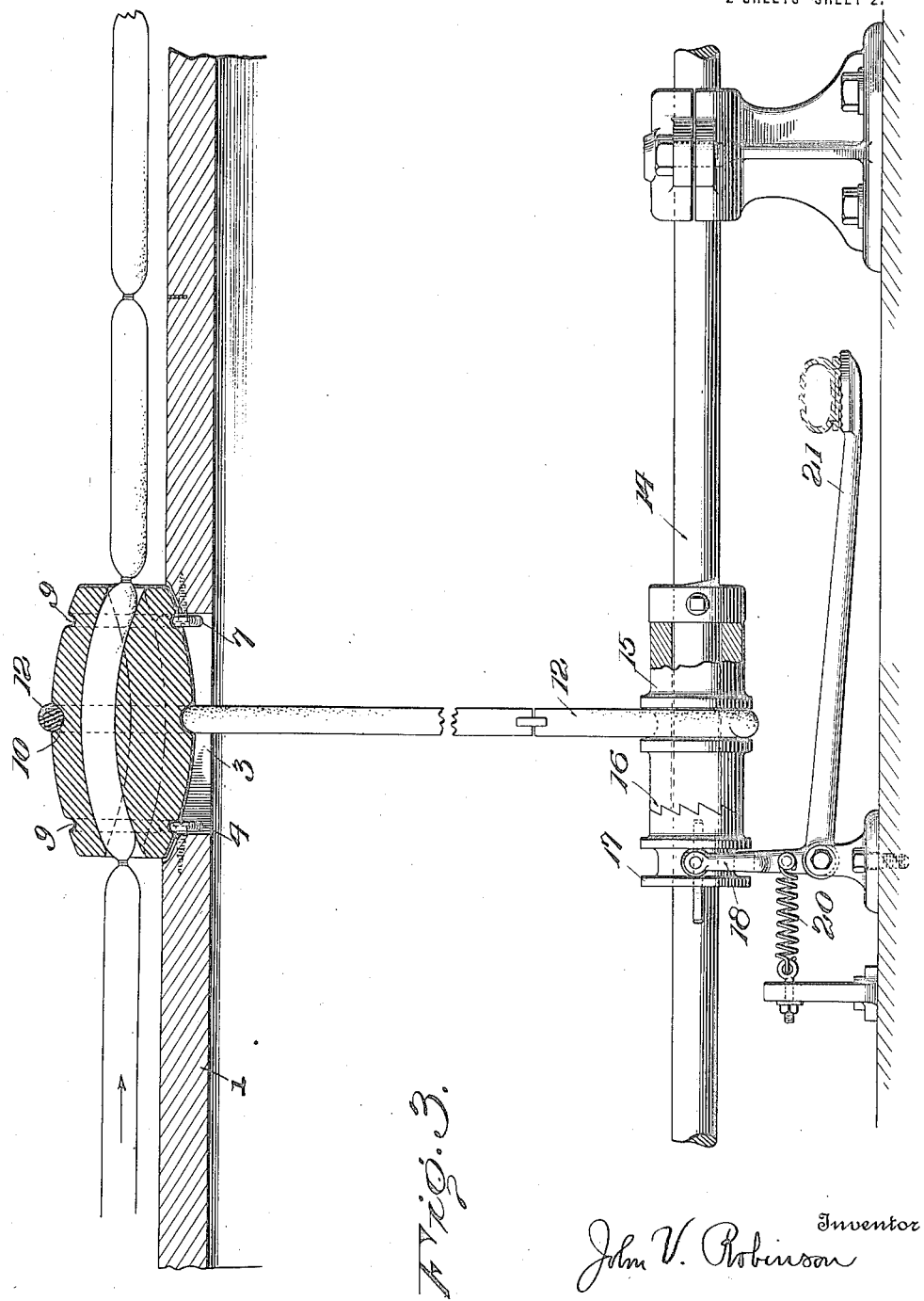

JOHN VERNON ROBINSON, OF RICHMOND, VIRGINIA.

METHOD OF AND APPARATUS FOR TWISTING SAUSAGES.

1,234,491. Specification of Letters Patent. Patented July 24, 1917.

Application filed April 10, 1917. Serial No. 160,951.

*To all whom it may concern:*

Be it known that I, JOHN V. ROBINSON, a citizen of the United States, and a resident of Richmond, in the county of Henrico and State of Virginia, have invented certain new and useful Improvements in Methods of and Apparatus for Twisting Sausages, of which the following is a specification.

This invention relates to improvements in the method of and apparatus for twisting sausages. So far as I know, sausages are now twisted by hand although patents have been granted on expensive and complicated machinery for twisting the sausages automatically. The object of my invention is to provide a simple method and machine whereby the sausages may be twisted without any expensive machinery and with the utmost speed. Having this end in view, my invention consists in the method of feeding a line of sausages through a twisting device, squeezing the line of sausage on opposite ends of the twisting device, holding the line of sausages on opposite sides and then rotating the twisting device whereby that part of the line of sausage within the twisting device is given a rapid twist. The line of sausage is then fed through the twisting device until it is in position for the operation to be repeated. In the preferable embodiment of my invention, I employ a twister which consists of a simple rotatable member having its bore distorted so that while the sausage may readily pass through the bore, the rotation of the twister will grip that part of the line of sausage within the distorted bore and rapidly twist the same to accomplish the desired twist in the sausage.

In the drawings accompanying and forming part hereof:

Figure 1 is a plan view of a table having my invention applied thereto.

Fig. 2 is a longitudinal section through the twisting device showing, in dotted lines, the fingers of an operator squeezing the sausage on opposite sides of the sausage preparatory to twisting.

Fig. 3 is a side elevation, with parts in section, showing a desirable form of mechanism for rapidly rotating the twisting device.

Referring now to the details of the drawings by numerals: 1 designates a table which, as illustrated in the drawing, is intended to support a machine, as 2, for filling the sausage skins or guts. The machine 2 is shown in diagrammatic form, for my invention relates to the method of and machine for twisting the line of sausages formed by said machine. In the preferable embodiment of my invention, I employ on opposite sides of the aforesaid table 1, simple twisting devices which will now be described. As indicated in Fig. 2, the table has an opening 3 therein preferably supporting anti-friction rollers 4, 5, 6 and 7, these rollers being best shown in Fig. 1. The rollers are designed to support and permit of the rapid and easy rotation of the twisting devices which, in the preferable embodiment, consist of a simple twister 8 of cylindrical or barrel form, the twister having grooves 9 and 10 therein into which the anti-friction supporting rollers 4 project. Each twister is also provided with a central groove 10 around which passes a belt 12 rotating the twister. This belt may pass to any desirable form of machinery, but I prefer to employ that shown in Fig. 3 which consists of a simple driving shaft 14 having a loose pulley 15 thereon with a clutch member 16 at its end; the shaft also having a driving clutch member 17 which is provided with a shifter 18 normally held by the spring 20 so that the driving clutch member 17 is normally out of contact with the clutch 16 on the loose pulley 15. A foot lever or treadle 21 is provided whereby the operator may connect the clutch members 16 and 17 to rotate the twister through the aforesaid belt 12 in a manner readily understood.

While any desirable means may be employed to cause the twister to grip the sausage and rotate the same, I prefer to provide my "grip" by having the bore of the twister distorted as clearly shown in each of the figures of the drawing. As shown in said drawings, the bore of the twister at the point where the sausage enters the twister and also at the point where the sausage leaves the twister is concentric with the twister but the bore between these points is distorted so as to be eccentric to the twister. Therefore, whenever a line of sausage is projected through the twister, that part which is within the confines of the twister is gripped by the eccentric bore and as the twister is rapidly rotated the part within the twister is rotated with respect to the parts of the line of sausage on opposite sides of the twister, and thereby twisted.

In carrying out my method or in using my apparatus the line of sausage may be taken directly from the sausage machine 2, or the line of sausage may be twisted after having been previously formed by the machine. In either event, the operator inserts the end of the line of sausage through the twister until the line projects beyond the twister a sufficient distance to form a sausage; then the operator squeezes the line of sausage on opposite sides of the twister, as shown in dotted lines in Fig. 2. When this is done the sausage is ready to be twisted. To perform the twisting operation, the operator holds the line of sausage on opposite sides of the twister, and presses the foot treadle 21, when the clutch members 16 and 17 engage to rotate the loose pulley 15 and thereby through the belt 12 give a suitable rotation to the twisting device 8. It takes only two or three rotations of the twisting device to form the proper twist, and as soon as this is completed the operator releases his foot, when the spring 20 breaks the clutch 16—17 and the rotation of the twister ceases. I desire to point out that in this manner two sausages are practically made at the same time. In other words, the operator each time feeds the line of sausage sufficiently to form two sausages, one-half of the amount fed projecting through the twister, and the other half being within the twister. Therefore when the twister is rotated, the near end of the sausage which projects beyond the twister and both ends of the sausage that is within the twister are simultaneously twisted. This makes an exceedingly rapid method of twisting.

From the foregoing and accompanying drawings, it will be seen that I have invented a new method of and apparatus for twisting sausages and that the apparatus is exceedingly simple, cheap to construct and unlikely to get out of order. It also meets every requirement from the sanitary standpoint.

It will be obvious that changes and modifications may be made without departing from the spirit of my invention, the scope of which will be set forth in the appended claims.

What I claim is:

1. The method of twisting sausages which consists in holding relatively stationary a single line of sausages at each end of a link, and imparting a whirling motion to said sausages between said ends, said whirling motion consisting of a constrained planetary movement about the axis of the parts so held.

2. The method of twisting sausages which consists in grasping a line of sausages with the hands of the operator at each end of a link and holding the line relatively stationary at each end of said link, and while the line is so held imparting to said link a whirling motion in a constrained planetary path, the whirling being under the control of the same operator who is holding the line.

3. In a device of the character described, a suitably mounted rotatable member having a substantially cylindrical fixed bore eccentric to the axis of said member at a point intermediate its ends.

4. In a device of the character described, a suitable table or support, a twisting device mounted thereon, and means for rotating the twisting device, the latter having a bore substantially concentric with the axis of the device at the ends thereof and eccentric thereto intermediate said ends.

5. In a device of the character described, a suitable table or support, a twisting device with a distorted bore mounted therein, a pulley beneath said table or support, and a belt passing around said pulley, through the said table or support and around said twisting device, whereby said belt may be slipped off of said twisting device and the latter removed from the table or support.

6. The method of twisting sausages which consists in grasping a line of sausages with the hands of the operator at each end of a link and holding the line relatively stationary at each end of said link, and while the line is so held imparting to said link a twisting motion, the twisting being under the control of the same operator who is holding the line.

In testimony whereof I affix my signature in presence of two witnesses.

JOHN VERNON ROBINSON.

Witnesses:
LESLIE H. CARDEN,
W. NORWOOD DOLES.